May 22, 1928.

J. P. POLSTER

CHAIN GRATE STOKER REPAIR LINK

Filed Sept. 10, 1925

1,670,983

Inventor
John P. Polster
Hastings W. Baker
Attorney

Patented May 22, 1928.

1,670,983

UNITED STATES PATENT OFFICE.

JOHN P. POLSTER, OF ST. LOUIS, MISSOURI.

CHAIN-GRATE STOKER-REPAIR LINK.

Application filed September 10, 1925. Serial No. 55,461.

One of the objects of this invention is to provide a stoker repair link which can be quickly applied to stoker chains without the necessity of moving the stoker link rods.

Another object of the invention is to provide a stoker repair link which can be inserted in a portion of a stoker chain grate where a link has been broken, and one which will transmit both a compressive and tensile strain comparable with the link that it repairs.

Another object of the invention is to provide a stoker repair link which can be held in position without the use of nuts, bolts or loose pins. In the preferred form of my invention I provide a means of supporting the fastening on the stoker link rod while the link is being forced into place, and securing the link in position by means of a spring latch or other equivalent means. The spring may form a part of the fastening itself or it may function independently thereof, such as by means of a trigger or it may be in the form of a leaf adapted to snap onto a projection on the fastening.

The invention may be used on stoker links of different forms and may be applied as a unit to a plurality of link rods or to a single one, either of which constructions being within the purview of my invention as set forth in the claims.

To illustrate a practical application of the invention, I have selected 3 forms of links as shown in the accompanying drawings, in which.

Figure 1:
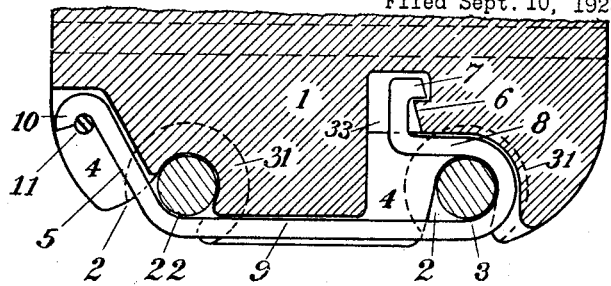
Fig. 1 is a sectional elevation of one form of a link embodying my invention.
Figure 2:
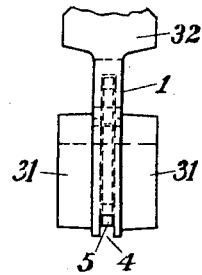
Fig. 2 is an end view of the link illustrated in Fig. 1.

Referring more particularly to the Figures 1 and 2, the body of the link is designated by the reference character 1 which body is provided with slots adapted to receive stoker link rods 3 and 22. The body 1 is also provided with an irregular shaped recess 4 for receiving the fastening 5, which is illustrated as a spring steel clip of suitable size and strength. The recess 4 is provided with a lug or projection 6 and extending across the other end of the recess is a stationary pin 11 secured in the side walls of the recess and forming a part of the body of the link.

The fastening 5 consists of a body portion passing under the stoker link rods 3 and 22 and lying in the recess 4. The fastening 5 is bent upwardly, partially around the rod 3 and thence upwardly through the recess 4 ending in a hook 7 adapted to engage the lug 6. The other end of the fastening 5 is bent at an angle beneath the rod 22 and terminates in a curved portion 10 which fits over the stationary pin 11.

The portion 8 of the fastening 5 rests on the stoker link rod 3 preventing the fastening from leaving the rod 3 while the body of the link 1 is being forced down into place so that the hook 7 will snap into place over the cam lug 6.

In order to assemble the parts shown in Fig. 1 it is only necessary to hang the fastening 5 on the stoker link rod 3 by means of the hook 8 and bring the fastening into contact with the rod 22. The stoker link body is inclined at such an angle that the fastening can be engaged by the pin 11. The body of the link is then forced down over the stoker link rod 3 and the lug 6 engages the spring hook 7, carrying it toward the left as shown in Fig. 1, until the hook 7 passes beyond the lug 6 whereupon the hook 7 springs into the recess above the lug 6.

33 is an opening extending through the body of the link 1 and affording access to the hook 7. The hook 7 may be disengaged from the lug 6 by inserting a wedge or pointed tool through the opening 33 whereupon the body 1 can be raised so that the fastening will disengage the pin 11. The body 1 may then be lifted or removed from the stoker rods 3 and 22 and used again.

Figure 3:
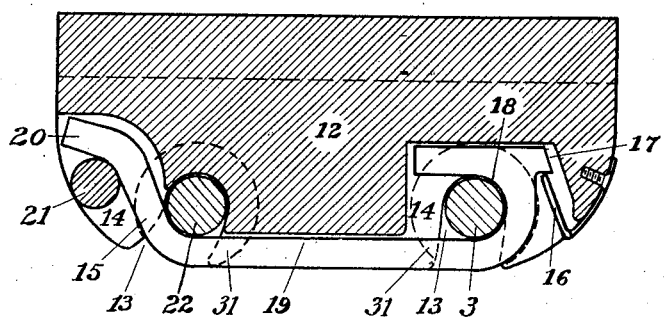
Fig. 3 is a sectional elevation of another form of a link embodying my invention.
Figure 4:
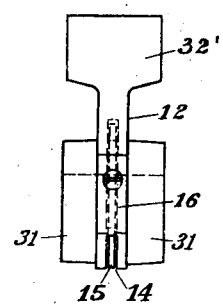
Fig. 4 is an end view of the link illustrated in Fig. 3.

In Figures 3 and 4, I have shown a modification. The body is denoted by the reference character 12 which is provided with slots 13 to receive the stoker link rods 3 and 22. An irregular recess 14 receives a fastening 15 which may be either a forging, stamping or casting. 16 is a spring catch in the recess 14 over which the hook 17 at the end of the fastening 15 passes and by which it is secured when the spring snaps into place. The fastening 15 is provided with a curved portion 18 resting on the link rod 3 and preventing the fastening from leaving the rod 3 while the body 12 is being or has been forced into place so that the spring 16 will underlie the hook 17. The portion of the fastening 15 underlying the body 12 is denoted by the reference character 19 which portion also underlies the rods 22 and 3 securely fastening the link to the stoker link rods. The other end of the fastening 15 is provided with a projection 20 which extends over a pin 21, carried by the body 12.

Th fastening 15 is inserted in the same manner as described in connection with Figures 1 and 2 except that the hook 17 forces the spring 16 outwardly when the body portion is being inserted on the rods 3 and 22 and as soon as the hook 17 passes beyond the spring 16, the spring 16 snaps under the hook 17 and holds the parts into position. The spring 16 is accessible and can be readily moved out of the way of the hook 17 by means of any suitable tool in case it is desired to remove the body 12 from the link rods.

Figure 5:
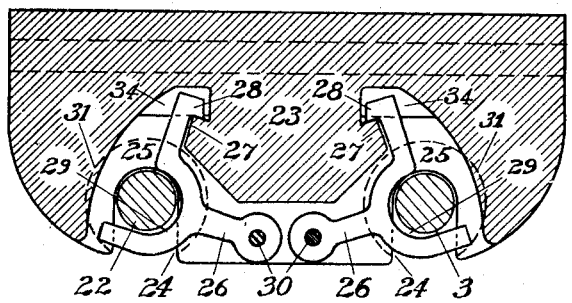
Fig. 5 is a sectional elevation of a third form of a stoker link embodying my invention as applied to each rod individually and Fig. 6 is an end view of the link illustrated in Fig. 5.
Figure 6:
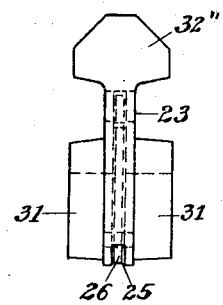

In Figures 5 and 6 I have shown a second modification. The body of the link is denoted by the reference character 23 which is provided with slots 24 allowing the link to seat on the stoker link rods 22 and 3, which body portion is also provided with recess 25 for receiving the fastening 26. The fastening 26 is in duplicate and a description of one will suffice for both. The fastening 26 is secured to the body 23 by a fixed pin 30 on which the fastening is pivoted. The fastening 26 is bifurcated forming a semi-circular fork 29 extending below and above the rod 3 or 22 and having a spring projection or latch 28 extending upwardly in the recess 25 so as to engage a projection 27 extending into said recess from the body.

As shown in Figures 5 and 6 the parts may be readily assembled by turning the fastenings 26 downwardly so that they extend below the body of the link and then by pressing the bifurcated parts 29 over the link rods 3 and 22 and forcing the body of the link downwardly so that the latches 28 will engage the lugs or projection 27 moving the latches 28 outwardly until they pass beyond the projections 27 when they snap into position so that the portions of the fastenings underlying the rods 3 and 22 are held in the assembled position.

In Figures 5 and 6 openings 34 are provided extending through the body of the link 23 which openings afford access to the hooks 28 which hooks 28 may be readily removed by inserting a pointed tool or wedge between the inner end of the hook 28 and the body 23 so as to move the hook 28 outwardly beyond the projection 27. The body 23 may then be lifted from the rods 3 and 22 as the arms 26 move downwardly withdrawing the portion of the fastenings underlying the rods 3 and 22.

Reinforcing and spacing bosses are provided at the rod receiving notches on all forms of the link bodies. The heads 32, 32' and 32" on the stoker link bodies may be of any required size or form.

I have thus provided by my invention a stoker repair link that can be quickly applied or removed. While I have shown the preferred construction of my invention, it is obvious that many changes may be made therein without departing from the spirit or scope of the invention. I therefore do not limit myself to the specific forms shown herein, but reserve the right to make all of the changes within the scope of the appended claims.

I claim:

1. In a chain grate, the combination of a stoker link body, supporting rods therefor, and a fastening for securing the link to the rods, said fastening having means for engaging the link and means for supporting itself on one of the supporting rods while the link body is being brought into engagement with said fastening and rods.

2. In a chain grate, the combination of a stoker link body, rods therefor, and a fastening for securing the link to the rods, said fastening having means for engaging the link and means for supporting itself on one of said rods while the link body is being brought into engagement with said fastening and rods, the means of support having the power to resist a downward thrust while the link body is being forced into position.

3. In a chain grate, the combination of a body of a stoker link, stoker link rods, the body being provided with an irregular opening, a fastening in said opening extending beneath said rods, a pin carried by the body and adapted to receive one end of the fastening, said fastening including a hook at the other end thereof, and a lug projecting from the body into the said opening and adapted to receive said hook to hold the parts in assembled position.

4. In a chain grate, the combination of a stoker link body, link rods therefor, the body being provided with an irregular opening, a cam lug projecting into said opening, a pin extending across said opening at the opposite end thereof from said lug, and a fastening adapted to extend over said pin, under said stoker link rods and over said lug, said fastening lying within said opening.

5. In a chain grate, the combination of a stoker link body, stoker link rods, a fastening means extending over one of said rods and beneath both of said rods, means whereby one of the ends of the fastening is secured to said body, and spring means whereby the other end is secured to said body when the parts are in assembled position.

JOHN P. POLSTER.